H. L. HOSTERMAN.
TIRE HOLDING RIM FOR WHEELS.
APPLICATION FILED MAR. 16, 1915.
1,163,151.
Patented Dec. 7, 1915.
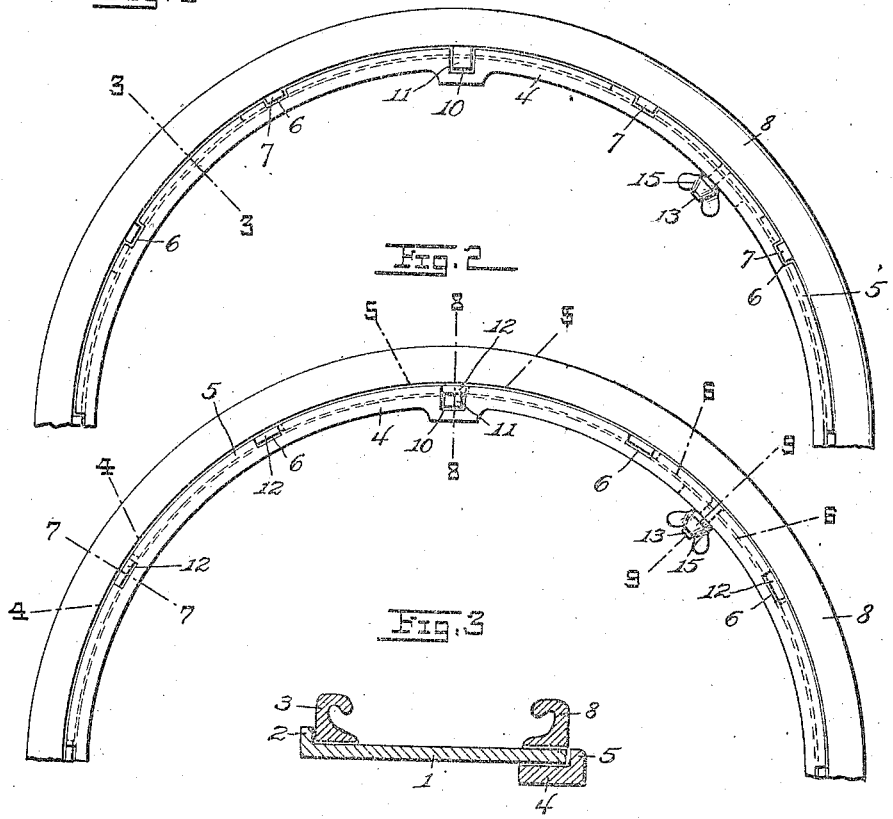
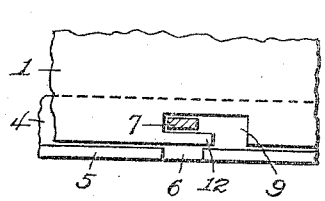
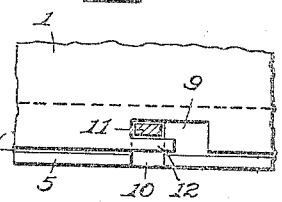
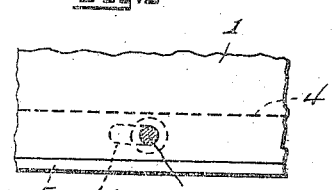
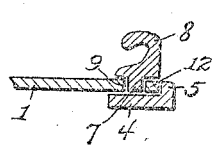
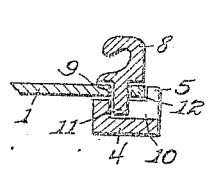
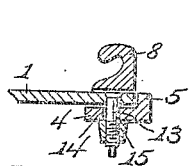
WITNESSES:
F. E. Arthur,
W. F. Keefer.
INVENTOR
H. L. Hosterman
BY
H. E. Dunlap
ATTORNEY.

UNITED STATES PATENT OFFICE.

HARRY LEO HOSTERMAN, OF PARKERSBURG, WEST VIRGINIA.

TIRE-HOLDING RIM FOR WHEELS.

1,163,151.  Specification of Letters Patent.  Patented Dec. 7, 1915.

Application filed March 16, 1915. Serial No. 14,667.

*To all whom it may concern:*

Be it known that I, HARRY L. HOSTERMAN, a citizen of the United States of America, and resident of Parkersburg, county of Wood and State West Virginia, have invented certain new and useful Improvements in Tire-Holding Rims for Wheels, of which the following is a specification.

This invention relates broadly to rims for the wheels of motor vehicles, and specifically to a rim and removable tire-holding device therefor.

The primary object of the invention is to provide an improved tire-holding device adapted for application to the wheels of automobiles and like vehicles, said device embodying a rim and means adapted for convenient application to said rim for removably securing a pneumatic or similar tire thereon.

A further object is to provide a wheel rim and a tire-holding ring having improved means for interlocking said ring on said rim.

A further object within the contemplation of the invention is to structurally improve and simplify that class of devices which are designed to hold pneumatic tires in place and permit of the ready application and removal of such tires.

With these and other objects in view, the invention resides in the features of construction, arrangement of parts, and combinations of elements which will hereinafter be fully described, reference being had to the accompanying drawings, forming a part of this specification, in which—

Figure 1 is a side elevation of a fragmentary portion of my invention, the parts being shown in the position assumed when applying the tire-holding ring to the rim and when said ring is ready for removal from said rim; Fig. 2 is a similar view, showing the rim in its mounted, or interlocked, position; Fig. 3 is an enlarged transverse section taken on the line 3—3, Fig. 1; Figs. 4, 5 and 6 are enlarged horizontal detail sections taken respectively on lines 4—4, 5—5, and 6—6, Fig. 2; and Figs. 7, 8 and 9 are enlarged transverse detail sections taken respectively on lines 7—7, 8—8 and 9—9, Fig. 2.

Referring to said drawings, in which like designating characters distinguish like parts throughout the several views, 1 indicates a wheel rim, flat on its under side when viewed in cross section, adapted to seat upon the usual felly of a wheel (not shown). Said rim has at its inner edge an upturned annular rib or flange 2 against which the usual encircling inner tire-holding ring 3 is adapted to seat, as shown in Fig. 3, while its outer edge is plain, as shown in Figs. 3, 7, 8 and 9.

Fitted against the interior surface of the rim adjacent to the outer edge of the latter is a narrow metal band 4 having along its outer edge an external peripheral flange 5 of a height not exceeding the thickness of the rim, said flange occupying a position in abutting relation to the outer edge of said rim. Opening through said flange 5 at regularly spaced distances is a plurality of openings or passageways 6 which are designed to permit of the passage therethrough of correspondingly shaped short lugs 7 formed on the internal face of an outer tire-holding ring 8 which is adapted to seat on said rim. Provided in said rim adjacent to its outer edge is a plurality of L-shaped slots 9 which are disposed at regular distances spaced to correspond with the spacing of the lugs 7 on ring 8 and of the openings or passageways 6 in the flange 5 of the band 4. One arm of each of said slots opens outward through the outer edge of the rim and is of a width adapted to permit of the passage therethrough of said lugs 7. The said outwardly opening arms of the slots 9 are adapted, when the band 4 occupies one position, to register with the passageways 6 in the flange 5, thus permitting the ring 8 to be freely slipped upon the rim.

Located at one or more suitable points in the band 4 are passageways 10 of greater depth than the passageways 6, the same extending partially through the band, as shown in Figs. 1, 2 and 8, or, if preferred, said passageways may extend wholly through the band in the form of slots. Said passageways 10 are designed to receive therein lugs 11 provided on the ring 8 at suitable points, said lugs being of greater length than the lugs 7 hereinbefore mentioned and being designed, when the band 4 is rotated with respect to the rim, to rotate the ring 8 therewith, carrying all of the lugs 7 and 11 into longitudinally disposed arms of the slots 9, in which position said lugs are disposed behind tongue-like members 12 whereby said ring 8 is maintained against displacement.

To prevent chance return rotation of the band 4 and ring 8 with respect to the rim, a number of bolts 13 are rigidly mounted in the rim and project outward through longitudinally disposed slots 14 provided therefor in the band 4. The projecting ends of said bolts are screw-threaded, and have adjusting nuts 15 mounted thereon adapted to be set in impinging relation to the band, as shown in Figs. 1, 2 and 9.

When it is required to remove the ring 8, as when the removal of a tire secured thereby is desired, the adjusting nut or nuts 15 are loosened, after which, by the application of force to the band 4, said band and said ring are together rotated forward with respect to the rim to bring the passageways 6 and 10 of said band into registering relation with the outwardly opening arms of the slots 9 and to carry the lugs 7 and 11 into register with said passageways, whereupon said ring may be freely slipped laterally off the rim.

From the foregoing it will be seen that I provide a simple and comparatively inexpensive device embodying novel and convenient means for locking a removable tire-holding ring in place on a wheel rim. It will be apparent, however, that various alterations in the form and arrangement of some of the parts may be resorted to without departing from the general spirit or scope of the invention as defined in the appended claims.

What is claimed is—

1. A tire holding device comprising a wheel rim having a plurality of regularly spaced L-shaped slots therein adjacent to its outer edge, one arm of each of said slots opening outward through said edge, a narrow rotatable band fitted against the internal face of said rim and having a peripheral flange at its outer edge disposed in abutting relation to the outer edge of said rim, said flange having passageways therethrough adapted to register with the outwardly opening arms of said slots, a tire-engaging ring disposed in embracing relation to said rim, said ring having lugs adapted to enter said slots through said passageways, means interlocking said band and said ring whereby rotary movement of the former is imparted to the latter, rearward rotation of said ring when said lugs lie in said slots being adapted to move said lugs into the longitudinal arms of said slots, and means for securing said band in fixed relation to said rim.

2. A tire holding device comprising a wheel rim having a plurality of regularly spaced L-shaped slots therein adjacent to its outer edge, one arm of each of said slots opening outward through said edge, a narrow rotatable band fitted against the internal face of said rim and having a peripheral flange at its outer edge disposed in abutting relation to the outer edge of said rim, said flange having passageways therethrough adapted to register with the outwardly opening arms of said slots, a tire-engaging ring disposed in embracing relation to said rim, said ring having lugs adapted to seat in the longitudinal arms of said slots for interlocking said ring and said rim, said passageways and said outwardly opening arms of said slots, when in register, permitting the passage of said lugs therethrough, means whereby rotary movement of said band with respect to said rim is imparted to said ring, and means for securing said rotary members in fixed relation to said rim.

3. A tire holding device comprising a wheel rim having a plurality of regularly spaced L-shaped slots therein adjacent to its outer edge, one arm of each of said slots opening outward through said edge, a narrow rotatable band fitted against the internal face of said rim and having a peripheral flange at its outer edge disposed in abutting relation to the outer edge of said rim, said flange having passageways therethrough adapted to register with the outwardly opening arms of said slots, a tire-engaging ring disposed in embracing relation to said rim, said ring having lugs adapted to seat in the longitudinal arms of said slots for interlocking said ring and said rim, said passageways and said outwardly opening arms of said slots, when in register, permitting the passage of said lugs therethrough, means extending through some of said slots interlocking said ring and said band except against lateral movement with respect to said rim, and means for securing said interlocked members in fixed relation to said rim.

4. A tire-holding device comprising a wheel rim having a plurality of bayonet slots therein, one arm of each slot opening through the outer edge of said rim, a band rotatable on the internal periphery of said rim, a tire-engaging ring disposed in embracing relation to said rim, said ring having lugs adapted to enter said slots, means interlocking said ring and said band, and means for securing said band in fixed relation to said rim.

5. A tire-holding device comprising a wheel rim having a plurality of bayonet slots therein, one arm of each slot opening through the outer edge of said rim, a band rotatable on the inner periphery of said rim, said band having means engaging the outer edge of said rim, a tire-engaging ring disposed in embracing relation to said rim, said ring having lugs adapted to enter said slots, means interlocking said ring and said band, and means for securing said band in fixed relation to said ring.

In testimony whereof, I affix my signature in presence of two subscribing witnesses.

HARRY LEO HOSTERMAN.

Witnesses:
D. E. DONOVAN,
JAMES F. WARD.